(12) United States Patent
Shimada et al.

(10) Patent No.: US 10,099,249 B2
(45) Date of Patent: Oct. 16, 2018

(54) METHOD FOR MANUFACTURING DECORATIVE PARTS, AND DECORATIVE PARTS

(71) Applicant: TRINITY INDUSTRIAL CORPORATION, Aichi (JP)

(72) Inventors: Tokinobu Shimada, Aichi (JP); Yukihiro Goto, Aichi (JP)

(73) Assignee: TRINITY INDUSTRIAL CORPORATION, Aichi (JP)

(*) Notice: Subject to any disclaimer, the term of this patent is extended or adjusted under 35 U.S.C. 154(b) by 0 days.

(21) Appl. No.: 15/120,531

(22) PCT Filed: Mar. 11, 2015

(86) PCT No.: PCT/JP2015/057101
§ 371 (c)(1),
(2) Date: Aug. 22, 2016

(87) PCT Pub. No.: WO2016/098359
PCT Pub. Date: Jun. 23, 2016

(65) Prior Publication Data
US 2017/0266690 A1 Sep. 21, 2017

(30) Foreign Application Priority Data

Dec. 17, 2014 (JP) .................. 2014-255190
Mar. 11, 2015 (JP) .................. 2015-047953

(51) Int. Cl.
| | |
|---|---|
| *B05D 5/06* | (2006.01) |
| *B05D 3/06* | (2006.01) |
| *B23K 26/00* | (2014.01) |
| *B23K 26/359* | (2014.01) |
| *B44C 1/22* | (2006.01) |
| *B05D 3/12* | (2006.01) |

(Continued)

(52) U.S. Cl.
CPC ............... *B05D 3/06* (2013.01); *B05D 1/38* (2013.01); *B05D 3/00* (2013.01); *B05D 3/12* (2013.01);
(Continued)

(58) Field of Classification Search
CPC ... B05D 3/06; B05D 3/00; B05D 3/12; B05D 5/02; B05D 5/06; B05D 7/02; B05D 7/54;
(Continued)

(56) References Cited

U.S. PATENT DOCUMENTS

2003/0052100 A1  3/2003  Wilfried
2012/0080823 A1  4/2012  Costin

FOREIGN PATENT DOCUMENTS

JP  2002-045785  2/2002
JP  2002-346467  12/2002
(Continued)

*Primary Examiner* — Catherine A. Simone
(74) *Attorney, Agent, or Firm* — Clark & Brody

(57) ABSTRACT

This invention provides a method for manufacturing a decorative-part that makes it surely and easily possible to provide fine hairline-patterns that are similar to real texture by a laser-drawing process. By the method for manufacturing the decorative part, a laser-drawing process is done onto the coating-film 21 that has been formed on the surface 13 of the three-dimensional part-material 12. In this process a laser-processed groove-group 23 consists of a number of laser-processed grooves 24, 25, thus providing the hairline-pattern 22 on the coating-film 21. The laser processed groove-group 23 consists of various types of arc-like laser-processed grooves 24, 25 that comprise different curvature radii R of 1,000 mm or more. The arc-like laser-processed grooves 24, 25 are arranged extending appropriately in the same direction and of which each groove crosses at three degrees or less in irregular overlaps that show the line of each groove being wider than any other part.

11 Claims, 7 Drawing Sheets

(51) Int. Cl.
  *B05D 5/02* (2006.01)
  *B05D 7/02* (2006.01)
  *B05D 7/00* (2006.01)
  *B05D 1/38* (2006.01)
  *B05D 3/00* (2006.01)
(52) U.S. Cl.
  CPC ............... *B05D 5/02* (2013.01); *B05D 5/06* (2013.01); *B05D 7/02* (2013.01); *B05D 7/54* (2013.01); *B23K 26/0087* (2013.01); *B23K 26/359* (2015.10); *B44C 1/228* (2013.01)
(58) Field of Classification Search
  CPC .. B23K 26/0087; B23K 26/359; B44C 1/228; B44C 1/22; Y10T 428/24438; Y10T 428/24355; Y10T 428/2457; Y10T 428/24471

USPC .......................................... 428/141, 151, 167
See application file for complete search history.

(56) References Cited

FOREIGN PATENT DOCUMENTS

| | | |
|---|---|---|
| JP | 2002-348146 | 12/2002 |
| JP | 2006-01159 | 1/2006 |
| JP | 2009-196127 | 9/2009 |
| JP | 2010-194993 | 9/2010 |
| JP | 2010-234562 | 10/2010 |
| JP | 2011-147969 | 8/2011 |
| JP | 2011-183437 | 9/2011 |
| JP | 2013-237020 | 11/2013 |

METHOD FOR MANUFACTURING DECORATIVE PARTS, AND DECORATIVE PARTS

TECHNICAL FIELD

This invention relates to a method for manufacturing decorative parts of which hairline patterns are provided onto parts-material shaped three dimensionally by a laser-drawing process, and that which relates to decorative parts having such hairline patterns.

TECHNICAL BACKGROUND

To improve the design or quality of automotive decoration or the like, the decorative parts of an automobile (i.e. the console-box, the instrument-panel and the arm-rest or the like) of which decorations are added onto the resin-compact surface of the parts-material are nowadays practically used. An example of the wide variety of decorative patterns used on the surface of said parts-material is the hairline-pattern. The hairline-pattern is one of which a number of hair-like lines are streamed in a single direction onto the surface of the parts-material. Generally, such a pattern is formed by a hairline-process of which a hairline-processing machine physically scratches very fine grooves onto the surface of the parts-material. Originally, the hairline process was done on shiny silvery-metallic materials such as aluminum, stainless steel or the like. It is recognized that doing such a process exaggerates the metallic texture of such silvery-metallic materials, thus causing a muted design.

As a decorating method of which a hairline pattern is provided onto the surface of said parts-material, a method using a decorating-sheet for example was conventionally suggested (see Patent Document 1). By the method shown in Patent Document 1, a decorating-sheet having a transfer layer of the hairline-pattern is initially prepared by using processing equipment incorporating sand paper and metallic brushes or the like. Tucking the decorating-sheet inside the metallic-mold and then molding it by injection produces a resin-compact of which the transfer-layer of the hairline-pattern is transferred onto the parts-material surface.

Another method is one by which hairline-pattern printing-layers, accumulated on the base material film, is hairline-like embossed, thus transferring the hairline pattern onto the surface of the resin compact, as initially suggested (see Patent Document 2). Another method is one by which the coating-film that was formed on the surface of the parts-material is removed by sand paper or by a metallic brush or the like, which method was also suggested (see Patent Document 3).

Recently, another method was used by which a group of laser-processed grooves made of multiple laser-processed grooves is formed on the surface of the coating-film of the parts-material by a laser-drawing process, thus directly adding the hairline-patterns onto the coating-film (see FIG. 1 of Patent Document 4).

PRIOR ARTS

Patent Documents

Patent Document 1: Japanese Published Unexamined Application No. 2010-194993
Patent Document 2: Japanese Published Unexamined Application No. 2010-234562
Patent Document 3: Japanese Published Unexamined Application No. 2002-45785
Patent Document 4: Japanese Published Unexamined Application No. 2013-237020

DISCLOSURE OF INVENTION

Problems to be Resolved by the Invention

It is naturally difficult to form and process fine grooves by using the above conventional methods of Patent Documents 1 to 3, of which each forming of the hairline-pattern depends on the physical process. Thus, it is still difficult to make a fine hairline-pattern that is close to real texture. The conventional method of using a metallic-mold requires a different metallic-mold for each product shape, thus leading to higher costs. However, by the conventional method, as described in Patent Document 4, a fine hairline-pattern that cannot be made by a metallic mold can be drawn onto the surface of parts-material by the laser-processing method.

However, simply drawing a number of fine laser-processed grooves in a linear fashion or in parallel cannot make a hairline pattern that is similar to real texture. Thus, there was still some room for improvement in the conventional laser-drawing technique. Therefore, a laser-drawing technology that makes it possible actually to realize the physical process in making natural texture and surely and easily attaining hairline-processing for quality designs has been desired.

Firstly, this invention achieved in light of the foregoing problems in providing a method for manufacturing decorative parts that makes it possible surely and easily to provide fine hairline-patterns that are similar to real texture by laser drawing such hairline-patterns onto three-dimensional parts-material. Secondly, by the above excellent manufacturing method, this invention provides decorative-parts of hairline-patterns of quality designs.

Means for Solving the Problems

In light of the above problems, the inventors by enthusiastic study learned that the quality of hairline-patterns depends on the planar view of line types and on the arrangements of fine laser-processed grooves consisting of hairline-patterns. Specifically, it is better to use arc-like curve lines of a very large curvature radius instead of simple straight-lines as fine laser-processed grooves of hairline-patterns. Also, it was recognized that it is better to use a combination of many varieties of arc-like curve-lines of different curvature radii, and that it is better to arrange such arc-like curve-lines in an approximately similar direction with each line crossing at a very small angle. The inventors then did repeat trial-and-error tests, and based on the results of those tests they finally came up with the following means of 1 to 11.

The invention as described in Means 1 refers to a method for manufacturing decorative-parts of which hairline-patterns are provided by forming a group of laser-processed grooves consisting of multiple laser-processed grooves by a laser-drawing process onto coating-film formed on a three-dimensional parts-material surface or on the parts-material surface itself whereon the curvature radius R of the group of laser-processed grooves is 1,000 mm or more and of which said surface consists of various types of arc-like laser-processed grooves having different curvature radii; and thereon said surface the various types of said arc-like laser-processed grooves are arranged extending in an approximately similar direction and of which each groove crosses at three degrees or less in irregular overlaps that show the line-width of each groove being wider than any other parts. Therefore, this invention of Means 1 easily and surely provides hairline patterns that are finer than and more similar to real texture compared to a number of patterns of which laser-processed grooves are simply drawn in a linear fashion or in parallel.

The invention as described in Means 2 refers to a method for manufacturing decorative parts according to Means 1, characterized in that the various types of arc-like laser-processed grooves, the parts other than the overlaps, are of a line-width of 30 µm and more and 200 µm or less and are of a depth of 5 µm or more and 35 µm or less and of which such grooves are too fine to be made by a metallic mold for making it possible in providing hairline patterns that are similar to real texture.

The invention as described in Means 3 refers to a method for manufacturing decorative-parts according to Means 1 or 2, characterized in that non-processed linear parts exist between the arc-like laser-processed grooves of which the widest line-width is wider than that of the overlaps. As such, the invention of Means 3 makes it possible in providing hairline patterns more similar to real texture by setting the above-size relationship between the widest line-width of the non-processed linear parts and the line-width of the overlaps.

The invention as described in Means 4 refers to a method for manufacturing decorative parts according to any one of Means 1 to 3, characterized in that before the laser-drawing process is done, the coating-film-forming process is done whereof coating-film is formed by using a coating-material containing a black pigment. As such, the invention of Means 4 makes it possible in providing a laser-drawing onto the flat and smooth decorative-surface of such coating-film, since the black coating-film was formed smoothly, although a sink or the like was formed on the surface of the parts-material made of e.g. a resin-compact, thus making it possible to provide quality hairline-patterns compared to hairline-patterns provided when the laser-drawing is done directly onto the surface of such parts-material.

The invention as described in Means 5 refers to a method for manufacturing decorative-parts according to any one of Means 1 to 4, characterized in that after the laser-drawing process is done, a protective coating-film-forming process is done whereby a protective coating-film is formed onto the surface of the coating-film by using a metallic-coating material containing a metallic-color pigment. As such, the invention of Means 5 makes it possible to provide a metallic-texture onto the surface of the parts-material made of e.g. a resin-compact. Thus, the above favorable hairline-patterns make it possible to emphasize the metallic texture and excellent taste.

The invention as described in Means 6 refers to a method for manufacturing decorative parts according to any one of Means 1 to 5, characterized in that during the laser-drawing process, a number of laser-drawing regions are set within the decorative-surface of the coating-film, and that laser irradiation is done so that the number of laser-drawing regions are contiguously arranged in the direction of the streamline of the hairline patterns, and that each end of the arc-like laser-processed grooves at the joining-point of the number of laser-drawing regions is connected so that the position is set to arrange the connecting-part of each said end in a non-linear fashion. As such, the invention of Means 6 makes the joining-part of the ends covert, which is different from the linear-joining part of the ends in the arc-like laser-processed grooves, thus making it possible to provide hairline-patterns of a long and natural texture on a comparatively large decorative-surface.

The invention as described in Means 7 refers to decorative parts of which hairline patterns are provided by forming a group of laser-processed grooves consisting of multiple laser-processed grooves by a laser-drawing process onto coating-film that was formed on a three-dimensional parts-material surface or on the parts-material surface itself whereon the curvature radius R of the group of laser-processed grooves is 1,000 mm or more and of which the said surface consists of various types of arc-like laser-processed grooves of different curvature radii; and that thereon said surface the various types of said arc-like laser-processed grooves are arranged extending in an approximately similar direction and of which each groove crosses at three degrees or less in irregular overlaps that show the line of each groove being wider than any other parts. As such, this invention of Means 7 provides hairline-patterns that are finer than and similar to real texture, thus making it possible to provide decorative-parts comprising hairline-patterns of quality design.

The invention as described in Means 8 refers to decorative-parts according to Means 7, characterized in that the various types of arc-like laser-processed grooves, the parts other than the overlaps, are of a line width of 30 µm and more and 200 µm or less and are of a depth of 5 µm or more and 35 µm or less. As such, the invention of Means 8 provides hairline patterns that are too fine to be made by a metallic-mold, thus making it possible to provide hairlines patterns that are similar to real texture.

The invention as described in Means 9 refers to decorative parts according to Means 7 or 8, characterized in that non-processed linear parts exist between arc-like laser-processed grooves of which the widest line-width is wider than that of the overlaps. As such, the invention of Means 9 makes it possible to provide hairline patterns more similar to real texture by setting the above-size relationship between the widest line-width of the non-processed linear-parts and the line-width of the overlaps.

The invention as described in Means 10 refers to decorative parts according to any one of Means 7 to 9, characterized in comprising a decorative-part formed by using a coating-material containing a black pigment. As such, the invention of Means 10 makes it possible to provide the laser drawing onto the flat and smooth decorative-surface of the coating-film, since the black coating-film was formed smoothly, although a sink or the like was formed on the surface of the parts-material made of e.g. a resin-compact, thus making it possible to provide quality hairline-patterns compared to those provided when the laser-drawing is done directly onto the surface of the parts-material.

The invention as described in Means 11 refers to decorative-parts according to any one of Means 7 to 10, characterized in that a protective coating-film is formed on the surface of the coating-film by using a metallic-coating material containing a metallic-color pigment. As such, the invention of Means 11 enables the hairline-patterns to emphasize a metallic texture and excellent taste.

Effect of the Invention

As described above, the invention of Means 1 to 7 makes it possible surely and easily to provide fine hairline-patterns that are similar to real texture by laser-drawing such patterns onto the three-dimensional parts-material or the coating-film formed on the surface of said three-dimensional parts. The invention of Means 8 to 11 also makes it possible by the above excellent manufacturing-method to provide decorative-parts comprising hairline-patterns for making quality designs.

MODES FOR CARRYING OUT THE INVENTION

Figure 1:
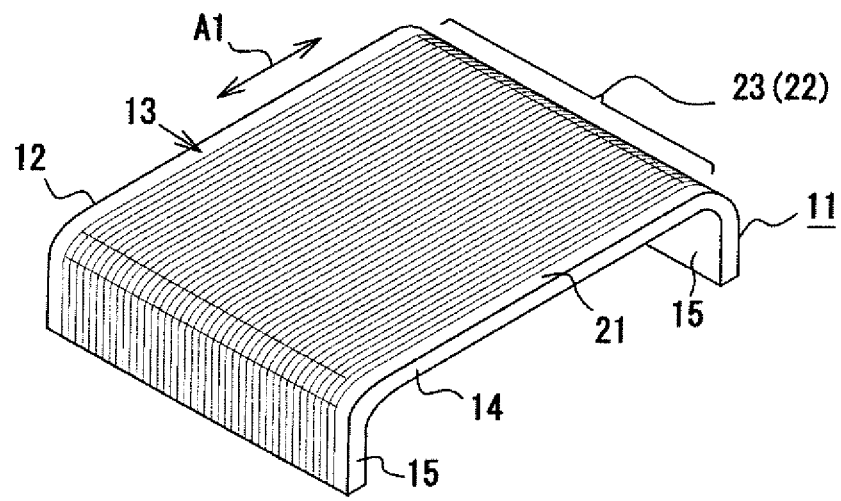
FIG. 1 is the enlarged schematic-perspective view of the major part showing the whole automobile interior-part as the embodiment of this invention.
Figure 2:
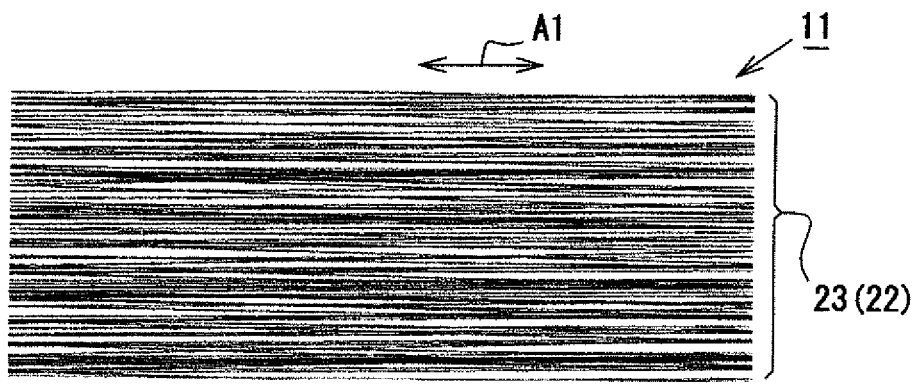
FIG. 2 is the enlarged plan-view of the major part showing the automobile interior-part as the embodiment of the invention.
Figure 3:
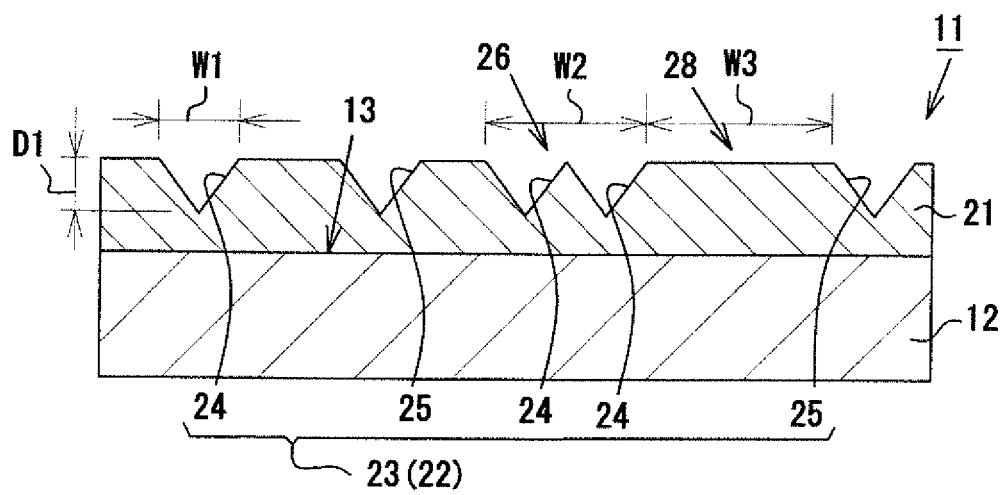
FIG. 3 is the enlarged cross-sectional view of the major part showing the automobile interior-part as the embodiment of the invention.
Figure 4:
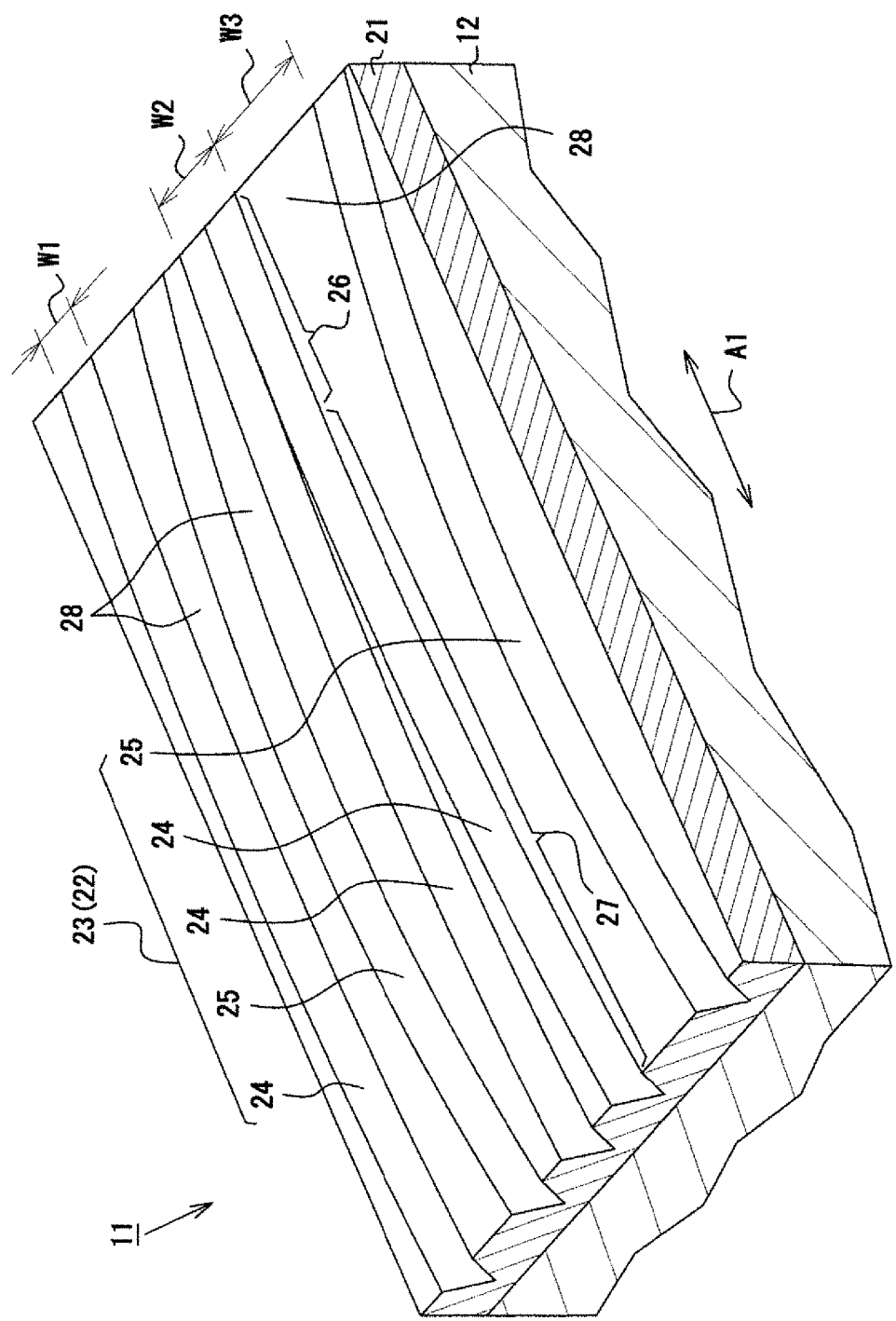
FIG. 4 is the enlarged perspective-view of the major part showing the automobile interior-part as the embodiment of this invention.

Hereinafter, as the embodiment of this invention, the automobile-interior parts and the method for manufacturing them will be described in reference to the drawings. FIG. 1 is the schematic-perspective view of the automobile-interior part 11 as a decorative part. FIG. 2 is the enlarged-plan view of its major part. FIG. 3 is the enlarged cross-sectional view of its major part. FIG. 4 is the enlarged perspective-view of its major part. As described in FIGS. 1 to 4, the automobile-interior part 11 has a three-dimensional parts-material 12 and a coating-film 21 formed to cover the surface 13 of the parts-material 12. The parts-material 12 as the embodiment of this invention has a flat main-part 14 and a pair of side-parts 15 that are contiguously arranged thereto. The main-part 14 and the pair of side-parts 15 make an angle of 90 degrees, making the cross-section of the parts-material 12 nearly U-shaped. The automobile-interior part 11 as the embodiment of this invention is, for example, a part making up an armrest of an automobile door. The parts-material 12 is a resin-compact made of ABS resin and is totally black in color.

A coating-material of high-gloss black (piano black) forms the coating-film 21 covering the surface 13 of the parts-material 12. The thickness of the coating-film 21 is set at about 15 μm to 50 μm (25 μm in this invention). Hairline-patterns 22 are provided onto the surface (e.g. the decorative surface) of the coating-film 21 by forming the laser-processed groove-group 23 made of a number of laser-processed grooves in the laser-drawing process. The laser-processed groove-group 23 is made of a number of laser-processed grooves, specifically, of two different types of laser-processed grooves 24, 25 in this invention. These two types of laser-processed grooves 24, 25 are of an arc-like shape with a very large and different curvature-radii R respectively. In this case, the curvature-radius R is set at 1,000 mm or more, preferably at 5,000 mm or more, most preferably at 7,000 mm or more and 50,000 mm or less. The reason that the curvatures are set as such is that if the curvature-radius R is too small and the number of laser-processed grooves are randomly arranged, the number of crossovers will be more, thus making it difficult to realize a hairline-pattern 22 that should be similar to real texture. If the curvature-radius R is too large, it makes no such difference compared to the case whereof the number of simple linear laser-processed grooves are arranged, thus making it difficult in realizing a hairline-pattern 22 that should be similar to real texture.

The laser-processed groove-group 23 of this embodiment consists of the combination of the first arc-like laser-processed groove 25 of a curvature radius R of approximately 7,500 mm and the second arc-like laser-processed groove 24 of a curvature-radius R of approximately 20,000 mm. The abundance-ratio of the first arc-like laser-processed groove 25 and the second arc-like laser-processed groove 24 is not particularly specified. That is, it is specified at the ratio of 10:1 to 1:10 or the like, i.e., specified at the ratio of 1:1 for the embodiment of this invention. The first and second arc-like laser-processed groove 25, 24 are arranged in an approximately similar direction of the streamline A1 of the hairline-patterns 22. Also, the arc-like laser-processed groove 24, 25 are arranged to cross each other at a very small angle (specifically at three degrees or less). If the angle is too large, the hairline-patterns 22 will not be streamlined, thus making it difficult for them to be close to real texture.

As shown in FIGS. 3 and 4, the arc-like laser-processed grooves 24, 25 are arranged to cross each other, as above, thus making the overlap-part 26 in an irregular position. The width of the overlap-part 26 looks wider than any other part (non-overlap-part 27) not being an overlap part.

The non-overlap-part 27 of the arc-like laser-processed grooves 24, 25 is formed having a line-width W1 of 30 μm or more and 200 μm or less and of a line-depth D1 of 5 μm or more and 35 μm or less. The reason that the line-width W1 and the line-depth D1 are set within the above ranges is to make it easier in realizing the favorable hairline-patterns 22 that are required for the purpose. The line-width W1 preferably should be 30 μm or more and 110 μm or less, more preferably 50 μm or more and 90 μm or less. The line-depth D1 preferably should be 6 μm or more and 16 μm or less, more preferably 10 m or more and 16 μm or less. The line-width W2 of the overlap-part 26 is set at e.g. approximately twice or more and five times or less than the line-width W1 of the non-overlap part 27, specifically at 69 μm or more and 600 μm or less.

As shown in FIGS. 3 and 4, the non-laser processed non-linear groove 28 exists between the arc-like laser-processed grooves 24, 25. Its widest line-width W3 is wider than the line-width W2 of the overlap-part 26. Specifically, the line-width W3 is set at e.g. 500 μm or more and 2,000 μm or less. The reason that the widest line-width W3 of the linear non-processed part 28 is set at less than the line-width W2 is that the density of the arc-like laser-processed grooves 24, 25 is greater, thus making it difficult in providing hairline-patterns 22 that are close to real texture.

Figure 5:
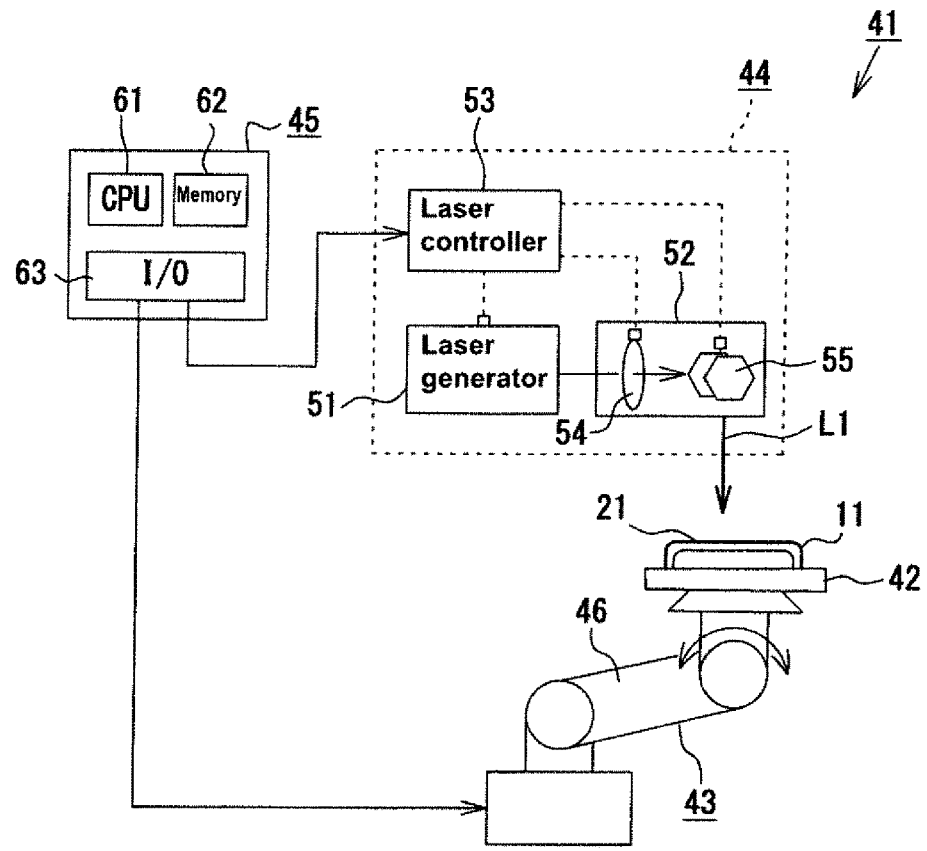
FIG. 5 is the schematic view showing the laser-decorative device used in manufacturing the automobile interior-part as the embodiment of this invention.

FIG. 5 shows the laser-decorating device 41 that is used in providing the hairline-patters 22 onto the pre-decorated automobile-interior part 11. The laser-decorating device 41 as the embodiment of this invention comprises a support-table 42 to support the automobile-interior part 11; a work-displacement robot 43 to move the support-table 42 in changing the attitude or the like of the automobile-interior part 11; a controller 45 to activate and control the work-displacement robot 43; and a laser-irradiating device 44.

The work-displacement robot 43 comprises a robot-arm 46 and a support-table 42 at the end of the robot-arm 46. The work-displacement robot 43 activates the robot-arm 46 to move the support-table 42 vertically, horizontally or rotationally, thus changing the position or attitude of the automobile-interior part 11, and thus changing the irradiation-position and irradiation-angle of the laser L1 onto the decorative-surface of the automobile-interior part 11.

The laser-irradiation device 44 comprises a laser-generator 51 for generating the laser L1 at a specified wavelength (e.g. a $YVO_4$ laser at wavelength 1,064 nm); a laser-deflector 52 for deflecting the laser L1; a laser-controller 53 for controlling the laser-generator 51; and a laser-deflector 52. The laser-deflector 52 is an optical system and adjusts the irradiation-position and focal point of the laser L1 by changing the position of the lens 54 and the reflecting-mirror 55. The laser-controller 53 controls the laser-generator 51 and laser reflector 52, thus adjusting the laser-irradiation condition of the laser L1 such as irradiation-intensity and scanning-velocity.

The controller 45 consists of a widely known computer, the CPU61, a memory 62, and an input-output Port 63 or the like. The controller 45 is electrically connected to the work-displacement robot 43 and to the laser-irradiation device 44, thus allowing for the activation and control of the work-displacement robot 43 and the laser-irradiation device 44 according to various activating signals.

The memory 62 of the controller 45 stores programs and other data to provide the hairline-patterns 22 onto the decorative-surface of the automobile-interior part 11, specifically, configuration-data for showing the three-dimensional shape of the automobile-interior part 11 and pattern-data according to the hairline-patterns 22 that is provided onto the automobile-interior part 11 or the like. The memory 62 stores programs and other data used in controlling the work-displacement robot 43 and the laser-irradiation device 44.

The method for manufacturing the automobile-interior part 11 is described hereinafter in reference to FIGS. 6 to 9.

Figure 6:
FIG. 6 is the partially schematic cross-sectional view showing the parts-material used in manufacturing the above automobile-interior part.
Figure 7:
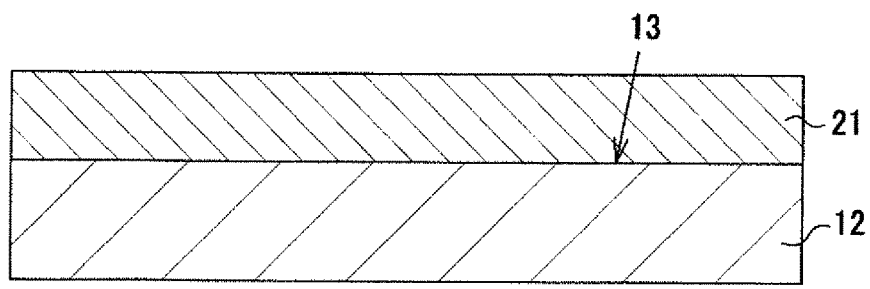
FIG. 7 is the partially schematic cross-sectional view showing the parts-material after completion of the coating-film-forming process of the manufacturing-method.
Figure 8:
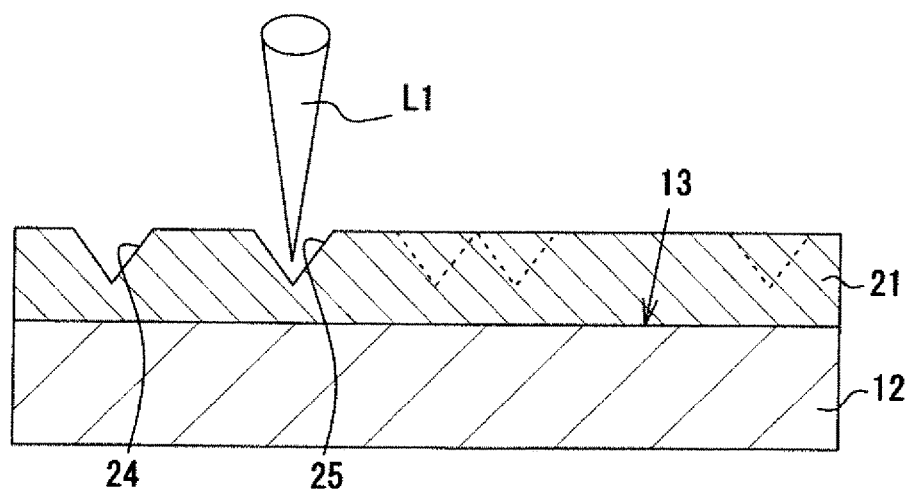
FIG. 8 is the partially schematic cross-sectional view showing the parts-material during the laser-drawing process of the manufacturing method.

Firstly, prepare the parts-material 12 that was formed by the use of ABS resin (see FIG. 6). Then, apply the coating-film 21 to the surface 13 of the parts-material 12 (see FIG. 7). Thereon, the whole surface 13 of the parts-material 12 (e.g. the main-part 14 and the side-parts 15) in three-dimensional shape becomes the decorative part.

Firstly, in the following laser-drawing process, the parts-material 12 is set on the support-table 42 of the work-displacement robot 61 (see FIG. 1). Next, the CPU 61 reads the laser-irradiation data for irradiating the laser L1 from the memory 62. Then, the CPU 61 generates the activating-signal based on the laser-irradiation data and emits the activating-signal to the laser-irradiation device 44. The laser-irradiation device 44 irradiates the laser L1 based on the activating-signal being emitted from the CPU 61. Also, the laser-controller 53 of the laser-irradiation device 44 irradiates the laser L1 from the laser-generator 51 and controls the laser-deflector 52 according to the patterns of the specific image-data. This controlling action determines the irradiation-position and focal-point of the laser L1. By such controlling action, the specific laser-irradiation is done, and the laser-processed groove-group 23 consisting of a number of arc-like laser-processed grooves 24, 25 is formed, thus providing the hairline patterns 22.

Figure 9:
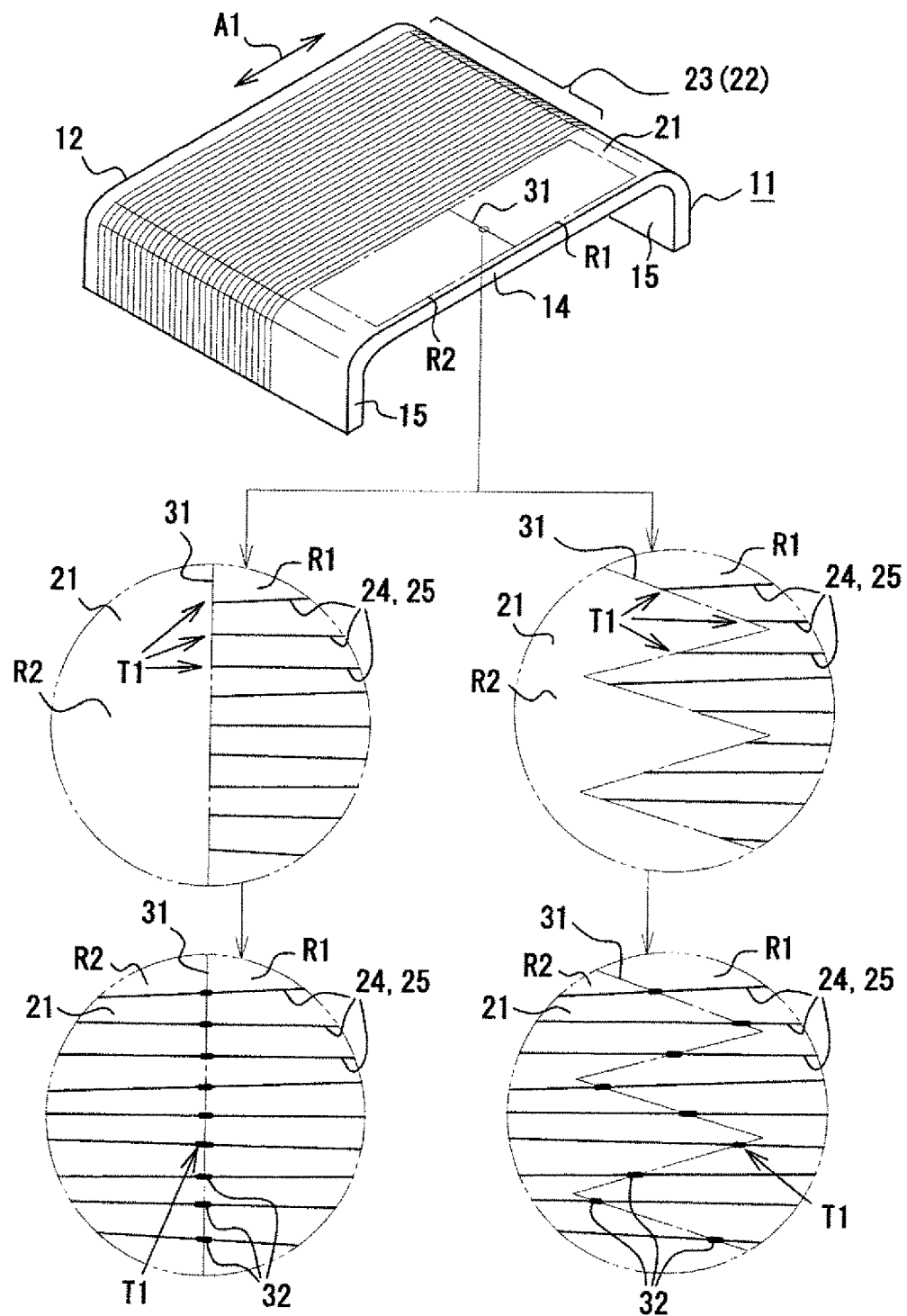
FIG. 9 is the explanatory view showing the joining-part of the number of laser-drawing regions during the laser-drawing process of the manufacturing method.

Specifically, in the laser-drawing process, a number of laser-drawing regions are preset within the decorative-surface of the coating-film 21. The perspective-view shown at the top of FIG. 9 shows the two rectangular-shaped laser-drawing regions R1, R2 arranged contiguously in the streaming-direction A1 of the hairline-pattern 22. In this perspective-view, the drawings except for those in the laser-drawing regions R1, R2 are already done. Also, the enlarged schematic-views shown in the middle and bottom of FIG. 9 describe the joining-point 31 of the laser-drawing regions R1 and R2. In the embodiment of this invention, the laser drawing is done on the first laser-drawing region R1 and then on the second laser-drawing region R2.

With respect to the drawing in the first laser-drawing region R1, laser-irradiation is provided in the direction of the longer side of the rectangular-shaped laser-drawing region R1 (i.e. in the streaming direction A1 of the hairline-pattern 22) to form the arc-like laser-processed grooves 24, 25. Thus, the end T1 of the arc-like laser-drawing processed grooves 24, 25 is located on the shorter side of the laser-drawing region R1. Then, a similar laser-drawing is done such that the laser-irradiation position is shifted little by little (e.g. by hundreds of μm) in the direction perpendicular to the streaming-direction A1 of the hairline-pattern 22, at which time the direction in forming the arc-like laser-processed grooves 24, 25 is accordingly slanted at an angle of 0 to 3 degrees with respect to the said streaming direction A1. Also, the drawing in the second laser-drawing region R2 is done by the same laser-irradiation that was done in the first laser-drawing region R1.

In FIG. 9, the middle left-hand drawing is the enlarged schematic-view showing the joining-point 31 at the end of the drawing in the laser-drawing region R1. This drawing shows the state when the laser-irradiation is done such that the end T1 of the arc-like laser-processed grooves 24, 25 is linearly arranged in the joining-point 31. The bottom left-hand drawing is the enlarged schematic-view of the joining-point 31 at the end of the drawing in the laser-drawing region R2. The laser-irradiation at this time is set such that the joining-point 31 is connected to both ends T1, and that such connecting-parts 32 are linearly arranged. However, the result of this method is that the joining-point 31 of each end T1 is still slightly noticeable.

In FIG. 9, the middle right-hand drawing is the enlarged schematic-view showing the joining-point 31 at the end of the drawing in the laser-drawing region R1. This drawing shows the state when the laser-irradiation is done such that the end T1 of the arc-like laser-processed grooves 24, 25 is non-linearly arranged in the joining-point 31. In the embodiment of this invention, the end T1 is arranged in a zigzag manner at the joining-point 31. The bottom right-hand drawing is the enlarged schematic-view showing the joining-point 31 at the end of the drawing in the laser-drawing region R2. The laser-irradiation at this time is set such that the joining-point 31 is connected to both ends T1, and that such connecting parts 32 are non-linearly arranged. This method, different from the above case whereof the connecting-part 32 of the end T1 is linearly arranged, shows the advantage that the joining-point 31 of each end T1 is not noticeable.

Figure 10:
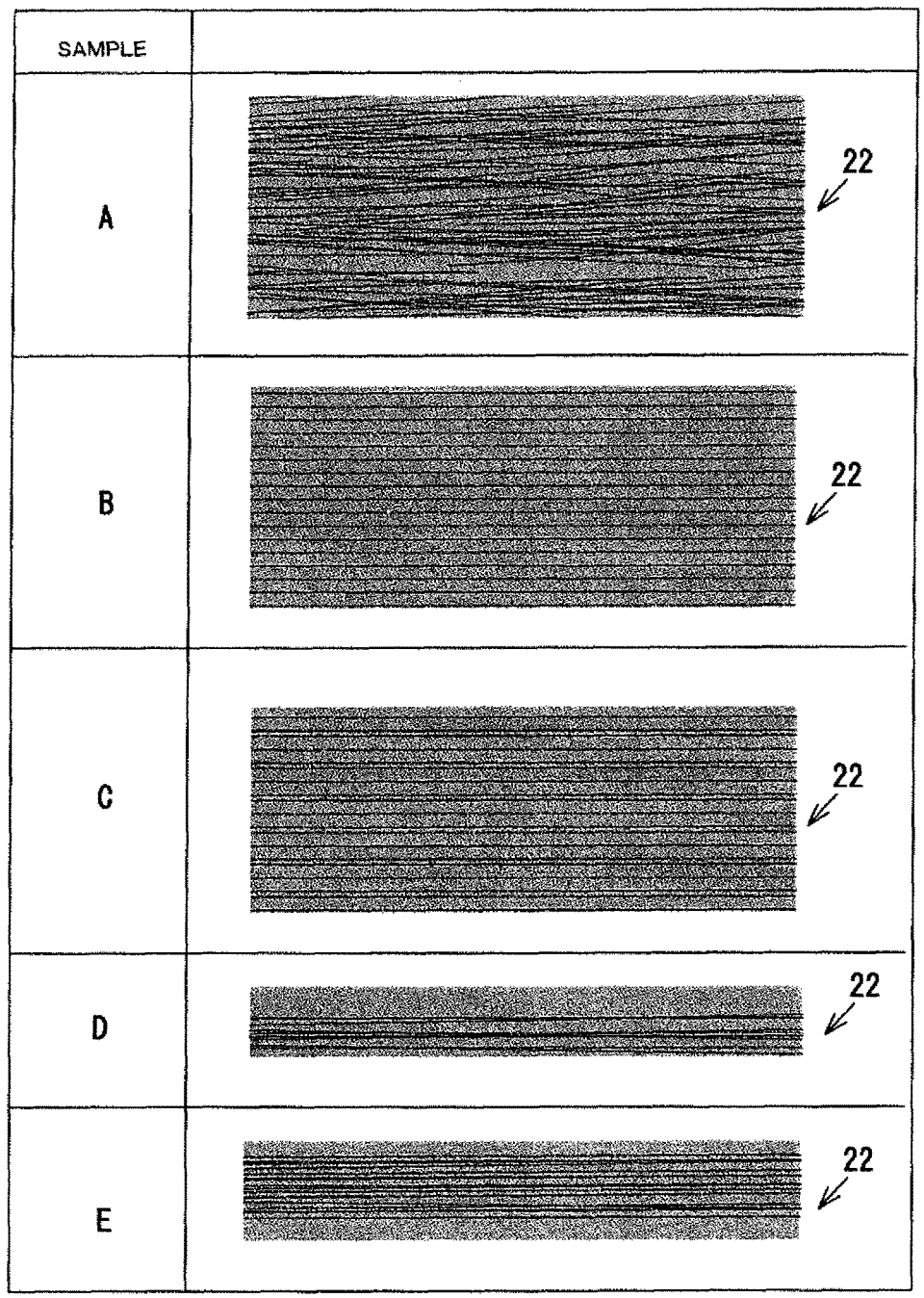
FIG. 10 is the explanatory view showing the comparative results of the line types and arrangements of the laser-processed grooves to be used in the laser-drawing process.

FIG. 10 is the explanatory-view showing the comparative result obtained in changing the line-types and arrangements of the laser-processed grooves to be used in the laser-drawing process and then in drawing the hairline patterns 22.

Of Sample A in FIG. 10, the line-type of the laser-processed groove is specified as a comparatively short and simple straight line. Also, the laser-processed groove is arranged such that the inclination-angle with respect to the streaming-direction A1 is 0 to 5 degrees. As such, Sample A provides a coarse impression on the hairline-pattern 22, making it much unlike real texture.

Of Sample B in FIG. 10, the line-type of the laser-processed groove is specified as a comparatively long and simple straight line. Also, the laser-processed groove is arranged such that the inclination-angle with respect to the streaming-direction A1 is 0 degrees, and each laser-processed groove is arranged in parallel in regular intervals. Of Sample C, the line-type of the laser-processed groove is also specified as a comparatively long and simple straight line and is also arranged such that the inclination-angle is 0 degrees. Each laser-processed groove is arranged in parallel in irregular intervals, (i.e. at a different distance from one another) As such, unlike Sample A, Samples B and C do not provide a coarse impression on the hairline pattern 22, thus characterizing that there is no crossover between the laser-processed grooves. Therefore, the hairline-pattern 22 of Samples B and C is too regular and too much unlike real texture.

Of Sample D in FIG. 10, the line type of the laser-processed groove is specified as being comparatively simple, short and straight. However, the laser-processed groove is arranged such that the above inclination-angle is 0 to 5 degrees. As such, Sample D has a crossover between the laser-processed grooves. However, the interval between the laser-processed grooves, which is farther away from the crossover, becomes wider, thus becoming more unlike real texture.

Of Sample E in FIG. 10, which shows the hairline-pattern 22 as the embodiment of this invention, there is an appropriate crossover between the laser-processed grooves that are not too regularly arranged, and the interval between them is not too wide. Therefore, Sample E, compared to the other samples, provides a hairline pattern 22 that is fine and similar to real texture.

Therefore, the embodiment of this invention realizes the following effects.

As described above, in the method for manufacturing the automobile-interior part 11 as the embodiment of this invention, instead of a straight line, an arc-like curve (i.e. the arc-like laser-processed grooves 24, 25) with a very large curvature-radius R is used. These arc-like laser-processed grooves 24, 25 are of different curvature radii R and are arranged extending in an approximately similar direction (in the streaming-direction A1 of the hairline-pattern 22). Also, the ark-like laser-processed grooves 24, 25 are arranged to cross each other at an angle of 3 degrees or less, thus providing the irregular-overlap 26 that seems to have a wider line-width W2 than that of the non-overlap 27. As such, compared to the case where the laser-processed groove was simply made by a number of drawings in linear and parallel fashion, the hairline-pattern 22, which is fine and similar to real texture, can be easily and surely provided on the decorative surface of the automobile interior part 11, thus making it possible to obtain an automobile interior part 11 comprising a hairline-pattern 22 of quality design.

By the method for manufacturing this invention, the line-width W1 of the non-overlap 27 of the two different types of arc-like laser-processed grooves 24, 25 is set at 30 µm or more and 200 µm or less, and the depth D1 is set at 5 µm or more and 35 µm or less. Then, the laser-drawing process is done. Setting the line-width W1 and line-depth D1 at the above value provides a hairline pattern that is too fine to be made by a metallic mold, thus making it possible to provide hairline patterns that are similar to real texture.

By the method for manufacturing in this invention, the non-processed part 28 is linearly provided between the arc-like laser-processed grooves 24, 25. The widest line-width W3 is set to be wider than the line-width W2 of the overlap 26. Then, the laser-drawing process is done. Setting the above-size relationship makes it possible to provide a hairline pattern 22 that is more like real texture.

By the laser-drawing process of the method for manufacturing in this invention, a number of laser-drawing regions R1, R2 are set within the decorative-surface of the coating-film 21 and then contiguously arranged in the streaming-direction A1 of the hairline-pattern 22. Laser-irradiation is done so that each end of the T1 of the arc-like laser-processed grooves 24, 25 is connected to the connecting-part 31 of the laser-drawing regions R1, R2, while the connecting-part 32 of the end T1 is set in a zigzag fashion. Different from the case whereof the connecting-part 32 of the end T1 of the arc-like laser-processed grooves 24, 25 is linearly arranged, the joining-point 31 of the ends T1 of the arc-like laser-processed grooves 24, 25 are covert, thus surely providing a hairline pattern 22 of a long and natural texture onto the comparatively large decorative-surface.

The embodiment of this invention can be modified as follows.

Figure 11:
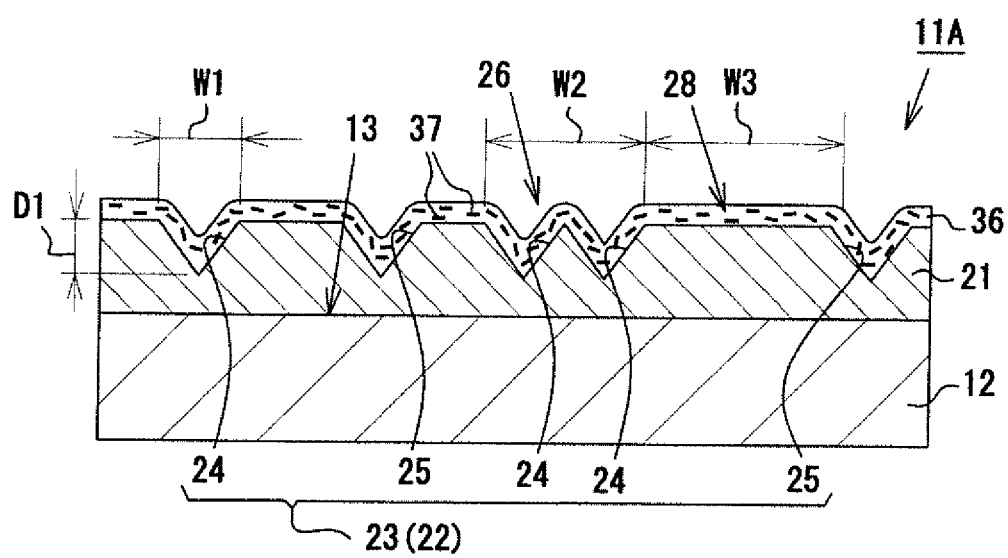
FIG. 11 is the enlarged schematic cross-sectional view showing the automobile-interior part as the embodiment of the invention.

As described in the embodiment of this invention, the coating-film 21 on which the hairline pattern 22 is provided is exposed on the upper-most layer. However, e.g., another protective-film can be formed on the coating-film 21. The automobile-interior part 11A as shown in FIG. 11, as another embodiment of this invention, comprises a metallic-coat layer 36 as a protective coating-film on the coating-film 21 on which the hairline pattern 22 is provided. Such a metallic-coat layer 36 is formed by applying after the laser-drawing process a metallic coating-material (i.e. a silver-metallic coating-material, or the like, of aluminum flakes or the like) containing metallic-color pigment 37. The thickness of the metallic-coat layer 36 is not specifically limited but is set to become slightly thinner than the thickness of the coating-film 21, about 5 µm to 20 µm to the extent that the hairline pattern 22 of the coating-film 21 becomes invisible. Therefore, the embodiment of which the protective-film-forming process is done makes it possible to provide a metallic texture of a hairline-pattern 22 onto the surface 13 of the parts-material 12 of the resin-compact. Such a hairline-pattern 22 makes it possible then to emphasize a metallic texture, thus providing an excellent finish to automobile-interior part 11A.

As described in the embodiment of this invention, the laser-processed groove group 23 consists of two different arc-like laser-processed grooves 24, 25 having a value of different curvature radii R. However they are not limited to two different curvature radii R. For example, it is possible to form the laser-processed groove-group 23 by three or more different types of arc-like laser-processed grooves having various values of curvature radii R.

As described in the embodiment of this invention, the coating-film 21 is made by using coating-material containing black pigment. However, it is possible to make the coating-film 21 using a different color (such as gray, brown or the like).

As described in the embodiment of this invention, the coating-film 21 is formed on the surface of the parts-material 12, and such a decorative surface is used in the laser-drawing process. However, it is not limited to that. For example, it is also possible to provide a hairline pattern 22 by applying the laser-drawing process directly onto the surface 13 of the parts-material 12 without forming the coating-film 21.

As described in the embodiment of this invention, the parts-material 12 consisting of ABS resin is used. However, a parts material made of e.g. acrylic-resin, polypropylene-resin, vinyl-chloride resin or the like can be used. However, the parts-material 12 is not limited to resin. For example, a metallic-material can be used.

As described in the embodiment of this invention, the method for manufacturing decorative-parts is embodied in the method for manufacturing component-parts such as the arm-rest of a door as one of the automobile-interior parts. However, it is also possible to be embodied in this method for manufacturing decorative-parts other component-parts of automobile-interior parts such as console-boxes, instrument-panels, sensor-clusters, cup-holders, glove-compartments, upper-boxes, safety-assist handles or the like. Besides automobile-interior parts, this invention can be naturally embodied in a method for manufacturing decorative-parts such as automobile-exterior parts (e.g. radiator-grills, emblems, mud-guards or the like) or for manufacturing the decorative-veneers of furniture, electric appliances or the like.

11: Automobile interior part 11 as the decorative part
12: Parts material
13: Surface
21: Coating film
22: Hairline pattern
23: Laser-processed groove-group
24, 25: Arc-like laser-processed groove
26: Overlap
28: Non-processed part
31: Joining point
32: Connecting part
36: Metallic-coat layer as the protective-coating film
D1: Depth
R1, R2: Laser-drawing region
T1: End (of the arc-like laser-processed groove)
W1: Line width (of a non-overlap)
W2: Line width (of an overlap)
W3: Widest line-width of a non-processed part

The invention claimed is:

1. A method for manufacturing decorative-parts of which hairline-patterns are provided by forming a group of laser-processed grooves consisting of multiple laser-processed grooves by a laser-drawing process onto coating-film formed on a three-dimensional parts-material surface or on the parts-material surface itself whereon the curvature radius R of the group of laser-processed grooves is 1,000 mm or more and of which said surface consists of various types of arc-like laser-processed grooves having different curvature radii; and thereon said surface the various types of said arc-like laser-processed grooves are arranged extending in an approximately similar direction and of which each groove crosses at three degrees or less in irregular overlaps that show the line-width of each groove being wider than any other parts.

2. A method for manufacturing decorative parts according to claim 1, characterized in that the various types of arc-like laser-processed grooves, the parts other than the overlaps, are of a line-width of 30 μm and more and 200 μm or less and are of a depth of 5 μm or more and 35 μm or less.

3. A method for manufacturing decorative-parts according to claim 1, characterized in that non-processed linear parts exist between the arc-like laser-processed grooves of which the widest line-width is wider than that of the overlaps.

4. A method for manufacturing decorative parts according to claim 1, characterized in that before the laser-drawing process is done, the coating-film-forming process is done whereof coating-film is formed by using a coating-material containing a black pigment.

5. A method for manufacturing decorative-parts according to claim 1, characterized in that after the laser-drawing process is done, a protective coating-film-forming process is done whereby a protective coating-film is formed onto the surface of the coating-film by using a metallic-coating material containing a metallic-color pigment.

6. A method for manufacturing decorative parts according to claim 1, characterized in that during the laser-drawing process, a number of laser-drawing regions are set within the decorative-surface of the coating-film, and that laser irradiation is done so that the number of laser-drawing regions are contiguously arranged in the direction of the streamline of the hairline patterns, and that each end of the arc-like laser-processed grooves at the joining-point of the number of laser-drawing regions is connected so that the position is set to arrange the connecting-part of each said end in a non-linear fashion.

7. A decorative part of which hairline patterns are provided by forming a group of laser-processed grooves consisting of multiple laser-processed grooves by a laser-drawing process onto coating-film that was formed on a three-dimensional parts-material surface or on the parts-material surface itself whereon the curvature radius R of the group of laser-processed grooves is 1,000 mm or more and of which the said surface consists of various types of arc-like laser-processed grooves of different curvature radii; and that thereon said surface the various types of said arc-like laser-processed grooves are arranged extending in an approximately similar direction and of which each groove crosses at three degrees or less in irregular overlaps that show the line of each groove being wider than any other parts.

8. A decorative-part according to claims 7, characterized in that the various types of arc-like laser-processed grooves, the parts other than the overlaps, are of a line width of 30 μm and more and 200 μm or less and are of a depth of 5 μm or more and 35μm or less.

9. A decorative part according to claim 7, characterized in that non-processed linear parts exist between arc-like laser-processed grooves of which the widest line-width is wider than that of the overlaps.

10. A decorative part according to claim 7, characterized in comprising a decorative-part formed by using a coating-material containing a black pigment.

11. A decorative-parts according to claim 7, characterized in that a protective coating-film is formed on the surface of the coating-film by using a metallic-coating material containing a metallic-color pigment.

* * * * *